United States Patent Office 3,328,313
Patented June 27, 1967

3,328,313
LIQUID UREA ADDUCTION
Geoffrey B. Dellow, Kensington, Calif., assignor to Shell Oil Company, New York, N.Y., a corporation of Delaware
No Drawing. Filed Nov. 30, 1964, Ser. No. 414,843
9 Claims. (Cl. 208—308)

This invention relates to an improved extractive crystallization process. More particularly, the invention relates to a process for the fractionation of a mixture of straight-chain containing organic compounds by bringing said mixture into contact with a solution of urea in methanol in an improved manner.

Processes for the fractionation of mixtures of organic compounds by means of adduct formation are well known in the art. This method of fractionation is based on urea forming crystalline complexes with straight-chain, or mainly straight-chain hydrocarbons, and thiourea doing so with branched-chain and cyclic hydrocarbons. Hydrocarbon hydrates, quinols, and other "clathrate" or cage-like complexes are able to trap smaller more spherical molecules. These complexes, called adducts, decompose, producing their original components, when heated at a temperature higher than that at which adduct formation took place.

The driving force for adduct formation is derived from Van der Waal's attraction between the channel walls and the adducted paraffin chain and form the formation of stronger "supported" hydrogen bonds between the urea molecules which spiral to form the channels. The channels produced by the formation of urea adduct all have an average diameter of 5.0–5.5 Angstroms, which ideally incorporates a n-paraffin, e.g., cetane ($n$-$C_{16}$), but not molecules of larger cross-section like benzene and highly branched paraffins. The tendency of an adductable paraffin to form an adduct increases rapidly with chain length, and is also very sensitive to the activity or concentration of the urea in solution.

Although adduction is frequently referred to as a "reaction," it is also helpful to consider it as a type of reversible crystallization and not as a chemical reaction in the usual sense. This is especially significant since many of the factors to be considered in conventional crystallization such as the effect of seeding, the presence of crystal growth inhibitors, degree of solution super-saturation and rates of diffusion, nucleation, and crystal growth are also controlling variables in urea or thiourea crystallization.

There are presently three general processes which have been developed for dewaxing with urea. The processes are normally compared on the basis of the physical state of urea as the main reactant and the accompanying process phenomena. The processes are classified as follows: (1) the use of solid crystalline urea, (2) the use of a low concentration urea solution, and (3) the use of a highly concentrated urea solution.

Each of the various processes which have been proposed can be employed in a continuous cyclic manner and involve four steps of varying complexity: (1) formation of the crystalline adduct by agitation of the hydrocarbon with either dissolved or solid urea, (2) separation of the reaction product into crystalline adduct and liquid phases, (3) decomposition of the adduct into urea (in the form of a solution or as a solid) and the adductable hydrocarbons, and (4) purification of the product streams and recovery of urea and solvent. The principle difficulty inherent in all urea processes results from the voluminous character of the adducts which often crystallize into small hexagonal needle-like crystals giving a very porous mass of low bulk density.

A recent summary of the processes wherein complex forming compounds are utilized, has been presented by A. Hoppe, in "Advances in Petroleum Chemistry and Refining," vol. VIII, pp. 192–234 (1964).

Methods for exploiting this interesting clathrate have been directed largely towards aqueous systems, principally for dewaxing specialty oils. Liquid systems, particularly aqueous, exhibit difficulties with emulsions and foams as well as filtration problems. Such processes, employing urea solutions, have been unsuccessful commercially as it has not been possible, among other factors, to grow crystals of inherent purity, which are easily separable from the remaining non straight-chain portion of the hydrocarbon feed. Among other factors which have inhibited the economic desirability of commercializing a urea extraction are the cost of urea loses and filtration and distillation of large amounts of solvent.

Processes employing solutions of urea in a solvent such as water or methanol have further been limited in their commercial application by (1) a difficulty of separating the small crystalline clathrates produced by known methods from the occluded and surrounding non straight-chain hydrocarbons, and (2) the use of large volumes of solvent-distillation.

It is, therefore, a principal object of this invention to separate organic compounds containing a uninterrupted long straight-chain portion of at least seven carbons from organic feed mixtures containing the same through a process employing urea crystallization in an improved manner. It is a further object to employ an improved process to separate non straight-chain hydrocarbons from a crystalline complex of urea by decomposition. Other objects of this invention will be apparent and the objects will be better understood from the description of the invention which is given hereinafter.

Now, in accordance with this invention, it has been found that organic compounds containing straight-chain portions of at least 7 carbons can be separated from an organic feed mixture including these straight-chain containing organic compounds and other organic compounds by contacting in a crystallizer with a large retention capacity, a mixture of the organic feed and an unsaturated solution of urea, in substantially pure methanol, while extracting heat from the mixture, thereby producing large crystals of clathrate composed of the physical combination of urea and the straight-chain containing organic compounds.

By "large crystals" are meant rod-shaped or cylindrical crystals of a length to diameter ratio of not greater than 10:1. The most preferred ratio is about 4:1. It has been found that average adduct crystals at least 20 microns in diameter and preferably from 20 to 100 microns in diameter are most advantageously separated from a non-adductable oil portion. It is also advantageous to have a crystal length of at least 100 microns and preferably from 100 to 500 microns. The large crystals produced by the instant process and possessing inherent purity have been found to be easily separated in a slurry from the non-adductable feed fixture.

By straight-chain containing organic compounds is meant normal hydrocarbons, straight-chain containing alcohols, esters, acids and ketones wherein the number of carbons present is between 7 and 35 and preferably between 9 and 25. Organic compounds containing short side chains may be present, but there must be straight-chain portions present which contain uninterrupted segments of at least 7 carbon atoms and preferably 8–12 carbon atoms.

If heat is extracted from the urea solution only in the crystallizer, retention time controlled and the water content minimized, deposit on, or clogging of heat exchanger surfaces is substantially eliminated and the crystals which are subsequently produced have been found to grow to a large size without occluded impurities. They are easily separated in conventional separation processes and are of substantially higher purity.

The removal of heat from the urea solution is accomplished in the crystallization zone, i.e., precooling of the urea solution must be avoided, and may be carried out by any of a number of preferred methods: (1) by introducing a stream of hydrocarbon feed previously cooled so that the temperature resulting in the combined mixture will be within the desired range and additionally with continuous cooling, if desired, by recycling a portion of the hydrocarbon stream through a refrigertor; (2) direct supply of refrigerant to cooling coils located within the crystallizer or in the walls of the crystallizer; and (3) introducing a volatile liquid into the crystallizer which removes heat by vaporizing a light n-paraffin, e.g., pentane, butane, propane and the like.

The instant process involves the introduction into the reactor of a "hot" solution of urea in methanol. By "hot" is meant a solution maintained at a temperature wherein the concentration of urea in methanol is less than that necessary to saturate the methanol solution, i.e., an unsaturated solution.

It is advantageous to employ a urea in methanol solution wherein the active urea available at the crystallizer temperatures will be at least 25% by weight of the unsaturated urea in methanol solution introduced into the crystallizer. By active urea is meant, urea available for adduction, in excess of that soluble at the crystallizer temperature. Therefore, the higher the temperture at which the feed urea in methanol solution is maintained, the greater load of urea which can be dissolved therein and the greater amount of excess, i.e., active urea, which will be present at the crystallizer temperature.

Although the temperature of solution of urea in methanol is directly related to the decomposition and the concentration of adduct in methanol, the urea-methanol solution can be retained at any temperature so long as the solution is unsaturated with urea. For example, it is quite advantageous to maintain the urea in methanol solution at a temperature of about 50° C. to 70° C. when the crystallizer temperature will be maintained at 0° C. to 20° C.

In this regard the temperature and equilibrium concentration of urea in the crystallizer are of critical importance in ensuring efficient removal of n-paraffins. The lower the temperature, the more effective will be the straight-chain containing hydrocarbon removal. For example, in treating a kerosene stream containing $C_{11}$ to $C_{14}$, the most economical temperature is in the range of 0° C. to 25° C., and urea concentration in the methanol phase leaving the crystallizer should be as near saturation as possible.

The length of time that is necessary for the reaction to be substantially completed will depend on the effectiveness of the contact of the immiscible phases. A conventional agitator may be used to ensure the degree of contact required.

It has been found that a contact time of from about 2 minutes to about 60 minutes is advantageous. The preferred range has been found to be 10 to 30 minutes. The contact mentioned is achieved by agitation and has a two-fold purpose, (1) to create a large interfacial area between the oil and methanol, i.e., by dispersing smaller droplets, and (2) to maintain a uniform concentration of urea throughout the crystallizer.

The urea in methanol solution employed in this invention is formed by combining urea with substantially pure methanol, i.e., containing less than 2% by volume of water and preferably less than 1% by volume of water.

The water content of the methanol/urea solution should be kept as low as possible to obtain large crystals, but can be advantageously maintained at up to 10.00% by volume in the solvent, because the decomposition temperature is lowered with an increase in water content, thus minimizing heat and refrigeration costs.

Although the instant process will have advantages in almost any ratio of concentration of methanol to crystalline adduct, the preferred range of ratios includes 10:1 to 1:1 with reference to methanol to adduct formed.

Again the ratio of urea solution to hydrocarbon entering the crystallizer can vary over a considerable range depending upon the degree of removal of the n-paraffin desired. However, advantages have been found in the ratios of 10:1 to 1:10 of urea solution to hydrocarbon feed. It is also especially advantageous to introduce the hydrocarbon feed, i.e., disperse the hydrocarbon feed into the urea/methanol solution contained in the crystallizer.

Conventional apparatus can be employed for the separation, because the type of adduct structure formed by the reaction herein is more easily separated from the occluded non straight-chain containing organic compound phase than those obtained by prior art methods. It is quite important that the separation be performed in an efficient manner as any non-adductible feed retained with the adduct will diminish the purity of the recovered straight-chain containing feed portion when the adduct is decomposed. Therefore, the separation step is of substantial importance.

It has been found advantageous to employ a low molecular straight-chain hydrocarbon, e.g., hexane, as an extraneous wash media for removing non-adductible material dissolved in the methanol solution. Hexane is easily separable from the resulting product and can be employed in relatively small amounts, i.e., less than ⅙ the volume of methanol, because the distribution coefficient between methanol and hexane favors the hexane. Purities in excess of 90% and up to and including 99% can be obtained by the instant process.

Decomposition of the adduct phase in admixture with the excess urea/methanol phase and hexane is accomplished in a conventional manner by increasing the temperature of the adduct a sufficient increment above that of the crystallizer temperature to decompose the adduct without decomposing the urea, to produce 2 immiscible phases, i.e., product and hexane and urea/methanol solution.

It is especially advantageous in this process to employ a simple settling means to accomplish the separation. The product can then be recovered through conventional means such as decantation.

Although urea clathrate formation applies to a wide range of straight-chain containing organic compounds and especially includes pour point depression of oils by removing straight-chain containing hydrocarbons therefrom, one especially advantageous embodiment of the invention involves the separation of normal paraffins having carbon numbers from 7 to 20 and especially in the preferred range of $C_9$ to $C_{17}$. This range of normal paraffins has special application in the preparation of biodegradable detergents.

The following specific example of the invention will serve to more clearly illustrate the application of the invention, but the details thereof are not to be construed as limiting the invention.

*Example I*

A West Texas kerosene at room temperature containing 20.6% by weight n-paraffin ($C_{11}$–$C_{14}$) was continuously fed into a crystallizer at a flow rate of 320 ml./hr. together with a hot methanol-water-urea solution at 60° C. at the rate of 1,320 ml./hr. This methanol-water-urea solution was of the composition 59% by weight methanol— 9% by weight water—32% by weight urea.

The crystallizer was a nominal 1 liter glass Morton Kettle which held 780 ml. when full. Heat was removed from the Kettle through its walls by a cold water bath which controlled the temperature within the crystallizer at about 20° C.

The residence time within the crystallizer of 29 minutes enabled large rod-like crystals of adduct to be formed of an average size of 300 microns long and 40 microns in diameter.

The slurry of adduct crystals in methanol phase leaving the crystallizer was then separated from the dispersed kerosene phase in a gently agitated vessel. The composition of the less dense denormalized kerosene was 6–7% by weight n-paraffins. The methanol phase contained 67% by weight methanol, 11% by weight water, 22% by weight urea.

The adduct in methanol slurry (free from kerosene droplets continuously flowed through a heated coiled tube to a vessel both of which were immersed in a bath at 60° C. Upon heating, the adduct crystals decomposed, the urea dissolving in the methanol and the adducted n-paraffins separating as an immiscible lighter phase while the methanol/urea solution was recycled to the crystallizer. The purity of the n-paraffin product was 80% by weight of the total hydrocarbons.

The 20% non n-paraffin impurity present in the product is largely due to the presence of 1.6% by weight kerosene dissolved in the methanol phase which enters the decomposer with the adduct crystals. The presence of as little as 20% impurity in the product confirms that all kerosene droplets were removed at the separator.

In order to obtain a pure product, a sample of adduct slurry was washed with hexane to remove impurities dissolved in the methanol. The adduct was then decomposed to give a product of 97.5% n-paraffin.

I claim as my invention:

1. A process for separating straight-chain containing organic compounds from an organic compound mixture containing the same and also containing other organic compounds which comprises:
   (a) contacting an unsaturated solution of urea in methanol and said organic mixture in a crystallization zone, while extracting heat therefrom, thereby causing crystalline clathrates of urea and said straight-chain containing organic compounds to form, wherein said contact is maintained until the crystalline clathrates grow to an average of at least 20 microns in each dimension, thereby forming three phases, a first phase comprising any excess solution of urea in methanol, a second phase comprising the organic mixture from which said straight-chain containing organic compounds have been separated and an adduct phase comprising the crystalline clathrates;
   (b) separating said second phase from said first and adduct phases;
   (c) decomposing said adduct phase in the presence of said first phase whereby said straight-chain hydrocarbons are recovered.

2. A process in accordance with claim 1 wherein the organic mixture is cooled before contacting the unsaturated urea in methanol solution.

3. A process in accordance with claim 1 wherein heat is extracted from the reactants in the crystallizer zone.

4. A process in accordance with claim 1 wherein the separation is accomplished in settling means.

5. A process in accordance with claim 1 wherein separation is followed by washing with a lower molecular weight hydrocarbon.

6. A process in accordance with claim 5 wherein the lower molecular weight hydrocarbon is hexane.

7. A process in accordance with claim 1 wherein the urea in methanol solution contains up to 1.0% water by volume based on the methanol present.

8. A process in accordance with claim 1 wherein straight-chain containing organic compounds are straight-chain containing hydrocarbons of 17 to 30 carbons and said organic compound mixture is a hydrocarbon mixture.

9. A process for separating normal paraffins of from 9 to 17 carbon atoms from a paraffin mixture containing the same and also containing other paraffins which comprises:
   (a) contacting said mixture with a solution of urea in methanol, unsaturated and at about 60° C., in a crystallization zone maintained at about 10° C., thereby causing crystalline clathrates of urea and normal paraffins to form, wherein said contact is maintained until the crystalline clathrates grow to an average of at least 20 microns in diameter, thereby forming three phases, a first phase comprising any excess solution of urea in methanol, a second phase comprising the paraffin mixture from which said normal paraffins have been separated and an adduct phase comprising the crystalline clathrates;
   (b) separating said second phase from said first and adduct phases with settling means;
   (c) washing said separated first and adduct phases with hexane, thereby removing any occluded second phases,
   (d) decomposing said adduct phase in the presence of said first phase and hexane whereby said normal paraffins form a separate phase substantially immiscible with the remaining components;
   (e) decanting said normal paraffin and hexane phase from the urea in methanol solution, whereby the urea in methanol solution is recovered for recycle to step (a); and
   (f) separating said hexane from said normal paraffin by distillation.

References Cited
UNITED STATES PATENTS

| | | | |
|---|---|---|---|
| 2,879,220 | 3/1959 | Arnold et al. | 208—25 |
| 2,903,441 | 9/1959 | Bethea | 208—25 |
| 2,917,447 | 12/1959 | Hoppe et al. | 208—25 |
| 3,071,534 | 1/1963 | Hoppe et al. | 208—25 |
| 3,108,942 | 10/1963 | Silva et al. | 208—25 |
| 3,117,923 | 1/1964 | Franz et al. | 208—25 |
| 3,247,177 | 4/1966 | Hepp | 260—96.5 |

FOREIGN PATENTS

| | | |
|---|---|---|
| 879,706 | 10/1961 | Great Britain. |

DANIEL E. WYMAN, *Primary Examiner.*

P. KONOPKA, *Assistant Examiner.*